(12) United States Patent
Hattori

(10) Patent No.: US 10,634,206 B2
(45) Date of Patent: Apr. 28, 2020

(54) FLUID-FILLED TUBULAR VIBRATION-DAMPING DEVICE

(71) Applicant: SUMITOMO RIKO COMPANY LIMITED, Komaki-shi, Aichi (JP)

(72) Inventor: Masaya Hattori, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 13 days.

(21) Appl. No.: 16/033,572

(22) Filed: Jul. 12, 2018

(65) Prior Publication Data
US 2019/0078639 A1  Mar. 14, 2019

(30) Foreign Application Priority Data

Sep. 12, 2017 (JP) .................................. 2017-174677

(51) Int. Cl.
| | |
|---|---|
| *F16F 13/16* | (2006.01) |
| *F16F 9/16* | (2006.01) |
| *F16F 9/43* | (2006.01) |
| *B60K 5/12* | (2006.01) |
| *F16F 13/14* | (2006.01) |

(52) U.S. Cl.
CPC .............. *F16F 9/16* (2013.01); *B60K 5/1208* (2013.01); *B60K 5/1291* (2013.01); *F16F 9/43* (2013.01); *F16F 13/1454* (2013.01); *F16F 13/16* (2013.01); *B60K 5/125* (2013.01)

(58) Field of Classification Search
CPC .... F16F 13/16; F16F 13/1427; F16F 13/1409; F16F 13/1463
See application file for complete search history.

(56) References Cited

U.S. PATENT DOCUMENTS

| | | | |
|---|---|---|---|
| 2016/0084340 A1* | 3/2016 | Kadowaki | F16F 13/1409 267/141.7 |
| 2017/0284502 A1* | 10/2017 | Hattori | F16F 13/105 |

(Continued)

FOREIGN PATENT DOCUMENTS

| | | | | |
|---|---|---|---|---|
| EP | 0754877 A1 * | 1/1997 | | F16F 13/16 |
| EP | 1387111 A1 * | 2/2004 | | F16F 13/16 |

(Continued)

OTHER PUBLICATIONS

Machine translation of EP 1387111, retrieved Sep. 19, 2019 (Year: 2019).*

*Primary Examiner* — Bradley T King
(74) *Attorney, Agent, or Firm* — Oliff PLC

(57) ABSTRACT

A fluid-filled tubular vibration-damping device including: an inner shaft member and an outer tube member connected by a main rubber elastic body defining a non-compressible fluid filling region partitioned into two axially-opposite fluid chambers connected by an orifice passage, by a partition wall rubber fixed to a side of the inner shaft member in an inner periphery thereof and inserted in a side of the outer tube member at an outer periphery thereof so that the partition wall rubber is axially movable relative to the side of the outer tube member; a seal tubular part formed integrally at the outer periphery of the partition wall rubber to axially protrude to opposite sides; and a thicker annular fitting part formed integrally at each protruding tip of the seal tubular part, and fitted in the side of the outer tube member, slidably along it.

4 Claims, 3 Drawing Sheets

(56) References Cited

U.S. PATENT DOCUMENTS

2017/0299008 A1\* 10/2017 Satou ................. B60K 5/12
2018/0223946 A1\* 8/2018 Kojima ............... F16F 13/1418

FOREIGN PATENT DOCUMENTS

| JP | S64-35138 A | 2/1989 |
| JP | S64-35139 A | 2/1989 |
| JP | H01-135940 A | 5/1989 |
| JP | H02-29899 B2 | 7/1990 |
| JP | H02-29900 B2 | 7/1990 |
| JP | H06-24595 Y2 | 6/1994 |
| WO | 2017/038357 A1 | 3/2017 |

\* cited by examiner

FLUID-FILLED TUBULAR VIBRATION-DAMPING DEVICE

INCORPORATED BY REFERENCE

The disclosure of Japanese Patent Application No. 2017-174677 filed on Sep. 12, 2017 including the specification, drawings and abstract is incorporated herein by reference in its entirety.

BACKGROUND OF THE INVENTION

1. Field of the Invention

The present invention relates to a fluid-filled tubular vibration-damping device capable of exhibiting vibration-damping effect based on flowing action of a fluid filled therein, and especially relates to a fluid-filled tubular vibration-damping device that is able to exhibit the vibration-damping effect in relation to an axial input vibration.

2. Description of the Related Art

Conventionally, a fluid-filled tubular vibration-damping device disclosed in Japanese Patent Republication No. JP-B-H2-029899 and the like, for example, has been used as a vibration-damping linkage device, a vibration-damping support device, or the like which is mounted between components of a vibration transmission system so as to reduce the vibration. The fluid-filled tubular vibration-damping device generally includes an inner shaft member, an outer tube member, a main rubber elastic body connecting the inner shaft member and the outer tube member, two fluid chambers positioned between the inner shaft member and the outer tube member, and an orifice passage connecting the fluid chambers. When a vibration is input, the fluid-filled tubular vibration-damping device exerts the vibration-damping effect based on the flowing action of the fluid flowing between the fluid chambers via the orifice passage.

For the fluid-filled tubular vibration-damping device, a structure wherein a partition wall that partitions the two fluid chambers is movable in the axial direction in relation to the inner shaft member as disclosed in JP-B-H2-029899 was proposed in order to obtain a forcible vibration-damping effect with respect to an axial input vibration.

In JP-B-H2-029899, a structure wherein a resin sleeve fixed to an inner peripheral face of a partition wall rubber is externally and slidably disposed on and about the inner shaft member is disclosed. However, with this structure, it is necessary to prepare the resin sleeve and fix the resin sleeve on the inner peripheral face of the partition wall rubber elastic body, so that the structure is complex and it becomes difficult to manufacture. Additionally, leakage of fluid pressure and short-circuit of the fluid are likely to occur between the both side fluid chambers through a gap between the resin sleeve and the inner shaft member, so that it is difficult to stably achieve the target vibration-damping performance.

Besides, as International Publication No. WO 2017/038357, a tubular vibration-damping device of a structure wherein an elastic part which partitions two fluid chambers is pushed against a rigid part on the outer tube member side in a non-adhesive way is also proposed. In WO 2017/038357, when a vibration with a large amplitude is input, the elastic part and the rigid part are spaced away, and the two fluid chambers are put in direct communication via this space, thereby making it possible to restrain the spring constant from rising. In WO 2017/038357, an outer peripheral end of the elastic part is disposed between protrusion portions provided at the rigid part, thereby avoiding relative position deviation of the outer peripheral end of the elastic part and the rigid part in the axial direction.

However, as WO 2017/038357, in a case the space is formed between the elastic part and the rigid part in the partition wall that partitions the two fluid chambers, and the fluid chambers are short-circuited in relation to each other via the space, the liquid pressure difference between the fluid chambers is reduced, and thus the fluid flowing amount via the orifice passage is reduced, so that the vibration-damping effect owing to the orifice passage may decrease. Particularly, for the structure of WO 2017/038357, with respect to the elastic part and the rigid part, contact faces do not have a special seal structure, and the elastic part in a state of being radially compressed is just pushed against the rigid part. Consequently, short-circuit between the fluid chambers easily occurs between the elastic part and the rigid part, so that also in a normal vibration input, the vibration-damping performance is easily decreased due to the short-circuit.

SUMMARY OF THE INVENTION

The present invention has been developed in view of the above-described matters as the background, and it is an object of the present invention to provide a fluid-filled tubular vibration-damping device with a novel structure which is able to exhibit vibration-damping effect based on the fluid flowing action with respect to an axial input vibration and keep fluid-tightness between the partition wall rubber and the side of the outer tube member while stably permitting relative axial movement between the partition wall rubber and the outer tube member.

The above and/or optional objects of this invention may be attained according to at least one of the following modes of the invention. The following modes and/or elements employed in each mode of the invention may be adopted at any possible optional combinations.

Specifically, a first mode of the present invention provides a fluid-filled tubular vibration-damping device comprising: an inner shaft member; an outer tube member; a main rubber elastic body connecting the inner shaft member and the outer tube member; a filling region of a non-compressible fluid formed between the inner shaft member and the outer tube member and partitioned by a partition wall rubber into two fluid chambers located at axially opposite sides thereof, the partition wall rubber being fixed to a side of the inner shaft member in an inner peripheral part of the partition wall rubber while being inserted in a side of the outer tube member at an outer peripheral part of the partition wall rubber so that the partition wall rubber is movable in an axial direction relative to the side of the outer tube member; an orifice passage connecting the two fluid chambers; a seal tubular part being integrally formed at the outer peripheral part of the partition wall rubber so as to protrude to the opposite sides in the axial direction; and an annular fitting part having a thicker wall than the seal tubular part being integrally formed at each protruding tip part of the seal tubular part, the annular fitting part being fitted in the side of the outer tube member such that the annular fitting part is slidable in relation to the side of the outer tube member.

According to the fluid-filled tubular vibration-damping device structured following the first mode, the partition wall rubber that partitions the two fluid chambers is fixed in the inner peripheral part thereof to the side of the inner shaft member, while it is made movable in the outer peripheral part thereof relative to the side of the outer tube member in the axial direction. Consequently, when an axial vibration is input and thus the inner shaft member and the outer tube member are relatively displaced in the axial direction, the relative pressure difference between the two fluid chambers becomes large. This induces large fluid flow through the orifice passage between the two fluid chambers, thereby advantageously exhibiting the vibration-damping effect owing to the orifice passage.

Additionally, the seal tubular part is formed integrally at the outer peripheral part of the partition wall rubber, while the annular fitting part with a thick wall is formed integrally with the protruding tip part of the seal tubular part. The annular fitting part is fitted in the side of the outer tube member, thus sealing the space between the outer peripheral face of the partition wall rubber and the side of the outer tube member fluid-tightly. This avoids short-circuit of the two fluid chambers in the space between the superposed faces of the outer peripheral face of the partition wall rubber and the side of the outer tube member, thereby effectively inducing relative pressure fluctuation of the two fluid chambers on a vibration input.

A second mode of the present invention provides the fluid-filled tubular vibration-damping device according to the first mode, wherein at an inner periphery of the outer tube member, an orifice member is disposed extending across an entire periphery, and the annular fitting part is fitted in relation to an inner peripheral face of the orifice member such that the annular fitting part is slidable in the axial direction in relation to the inner peripheral face of the orifice member.

According to the second mode, using the shape of the orifice member that is attached to the side of the outer tube member or the like, it is possible to set the free length of the partition wall rubber in the axis-perpendicular direction, the axial length of the face on which the annular fitting part slides, and the like, with a great degree of freedom.

A third mode of the present invention provides the fluid-filled tubular vibration-damping device according to the first or second mode, wherein the main rubber elastic body has an outer wall rubber constituting each axial side wall of the filling region, while the partition wall rubber is integrally formed with the outer wall rubber on each axial side.

According to the third mode, by forming the partition wall rubber and the outer wall rubber integrally, it is possible to simplify the structure and reduce the number of rubber vulcanization-molded bodies. Particularly, since the partition wall rubber is fixed to the side of the inner shaft member, if the orifice member and the like are provided at the side of the outer tube member in structure, it is easy to form the partition wall rubber and the outer wall rubber integrally.

A fourth mode of the present invention provides the fluid-filled tubular vibration-damping device according to any one of the first to third modes, wherein a space is set between an outer peripheral face of the seal tubular part and the side of the outer tube member.

According to the fourth mode, sliding resistance between the outer peripheral face of the seal tubular part and the side of the outer tube member is moderated, and noise and abrasion accompanying the sliding movement can be moderated as well. Besides, the seal tubular part has a thinner wall than the annular fitting part. Therefore, when in the axial vibration input, the partition wall rubber is displaced in the axial direction relative to the side of the outer tube member, while inducing the pressure fluctuation in the fluid chambers, the seal tubular part is pushed against the side of the outer tube member by the pressure of the fluid chamber with the positive pressure. This substantially cancels the space between the seal tubular part and the side of the outer tube member, thereby making it possible to keep good sealing performance. Moreover, the contact pressure between the partition wall rubber and the side of the outer tube member is made to act intensively on the annular fitting part, so that the sealing performance by the annular fitting part improves. This makes it possible to more favorably prevent the short-circuit of the two fluid chambers by the space between the partition wall rubber and the side of the outer tube member.

A fifth mode of the present invention provides the fluid-filled tubular vibration-damping device according to any one of the first to fourth modes, wherein as a shape of a single state before insertion into the side of the outer tube member in the partition wall rubber, the seal tubular part has a straight tube shape extending in the axial direction with a substantially constant transverse face shape, and the protruding tip part of the seal tubular part protrudes to an outer peripheral side providing the annular fitting part.

According to the fifth mode, since the initial shape of the seal tubular part is a straight tube shape, the design and the manufacture are easy, and concentration of local stress and deformation can be moderated or avoided.

A sixth mode of the present invention provides the fluid-filled tubular vibration-damping device according to any one of the first to fifth modes, wherein in the partition wall rubber, a groove-shaped recess is provided extending in a peripheral direction in each axial side face at a position on an inner peripheral side of a protrusion portion of the seal tubular part protruding to each axial side.

According to the sixth mode, by the groove-shaped recesses provided at the both axial side faces, the partition wall rubber has a constricted shape. Consequently, elastic deformation of the partition wall rubber in this constricted part is allowed comparatively easily, while the seal tubular part protrudes to the both axial sides from the portion positioned on the outer peripheral side of the constricted part in the partition wall rubber. Therefore, when the seal tubular part is displaced in the axial direction relative to the side of the outer tube member, the whole partition wall rubber positioned on the outer peripheral side of the constricted part easily tilts in the axial direction by friction resistance exerted on the seal tubular part. As a result, the entirety of the seal tubular part undergoes tilting deformation in relation to the side of the outer tube member, so that the seal tubular part positioned on the front side in the movement direction of the axial direction is pushed against the inner shaft member more effectively, enabling further improvement of the sealing performance.

A seventh mode of the present invention provides the fluid-filled tubular vibration-damping device according to any one of the first to sixth modes, wherein at an axially middle portion of the inner shaft member, an outside projection is formed projecting to the outer peripheral side, and the inner peripheral part of the partition wall rubber is fixed to the outside projection.

According to the seventh mode, the outside projection on the side of the inner shaft member that is fixed to the inner peripheral part of the partition wall rubber secures a large fixation area of the partition wall rubber to the side of the inner shaft member. Moreover, the partition wall rubber is restrained by the outside projection, suppressing elastic deformation thereof, so that the piston action of the partition wall rubber further improves in an axial vibration input, and the pushing force of the partition wall rubber against the side of the outer tube member is stably maintained across the entire periphery.

According to this invention, the partition wall rubber that partitions the two fluid chambers is fixed to the side of the inner shaft member in the inner peripheral part thereof, while it is made movable in the axial direction relative to the side of the outer tube member in the outer peripheral part thereof. As a result, the relative pressure difference between the two fluid chambers induced when an axial vibration is input gets large, thus advantageously exerting the vibration-damping effect owing to the orifice passage. Additionally, at the protruding tip part of the seal tubular part formed integrally with the outer peripheral part of the partition wall rubber, the thick-walled annular fitting part is integrally formed. By fitting the annular fitting part in the side of the outer tube member, the space between the outer peripheral face of the partition wall rubber and the side of the outer tube member is sealed fluid-tightly, thus preventing the short-circuit of the two fluid chambers, so that the relative pressure fluctuation between the two fluid chambers is effectively induced.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein.

DETAILED DESCRIPTION OF EMBODIMENTS

Embodiments of the present invention will be described below in reference to the drawings.

Figure 1:
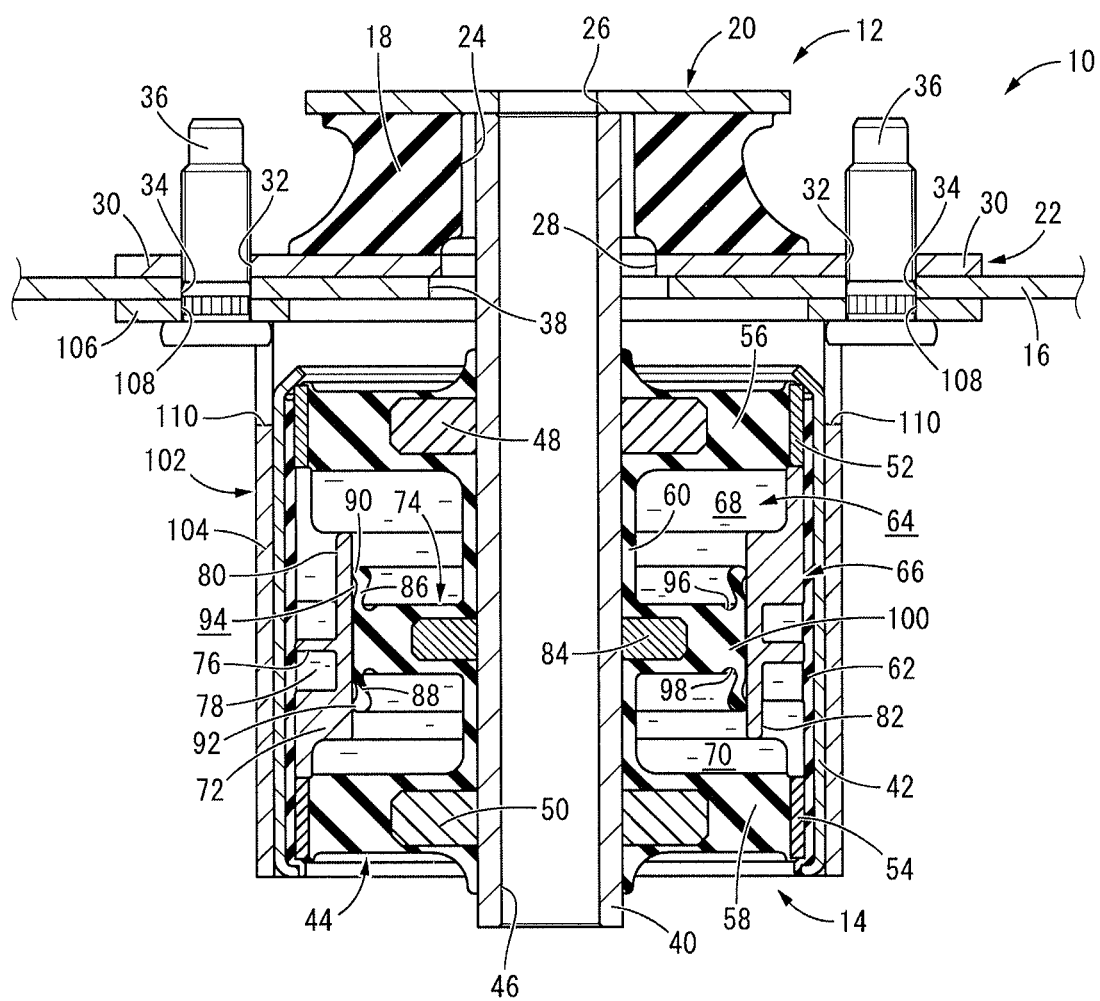
FIG. 1 is a cross sectional view showing a cab mount as a first embodiment of the present invention.

FIG. 1 shows an automotive cab mount 10 having a fluid-filled tubular vibration-damping device of a structure according to this invention, as a first embodiment of this invention. The cab mount 10 of this embodiment has a structure wherein an upper mount 12 and a lower mount 14 are mounted as being combined in the up-down direction while clamping a vehicle body 16 between them. The fluid-filled tubular vibration-damping device according to the present invention is constituted including the lower mount 14. In the description hereafter, the up-down direction and the axial direction are the up-down direction in FIG. 1, which is roughly the up-down direction in a state of being mounted on the vehicle.

The upper mount 12 has a structure wherein a top plate metal fitting 20 and a bottom plate metal fitting 22 are superposed and fixed respectively to the upper and lower faces of a connection rubber elastic body 18.

The connection rubber elastic body 18 includes an inner hole 24 that passes through it on its central axis, and a tapered outer peripheral face whose diameter becomes gradually smaller as it goes upward. The top and bottom plate metal fittings 20, 22 have an annular plate shape respectively including central holes 26, 28. Each of the central holes 26, 28 is communicated with the inner hole 24 of the connection rubber elastic body 18.

The inner diameter of the central hole 26 of the top plate metal fitting 20 is smaller than any of the central hole 28 of the bottom plate metal fitting 22 and the inner hole 24 of the connection rubber elastic body 18. Additionally, at the bottom plate metal fitting 22, fixation parts 30 are provided at a plurality of locations in the peripheral direction while expanding to the outer periphery. In each fixation part 30, a bolt insertion hole 32 is formed.

The upper mount 12 is mounted in a state of being superposed on the upper face of the mount attachment section in the vehicle body 16. In the mount attachment section of the vehicle body 16, a plurality of bolt insertion holes 34 are formed, and a fixation bolt 36 inserted through each bolt insertion hole 34 is inserted into the respective bolt insertion hole 32 of the bottom plate metal fitting 22, and a not-shown nut is threaded onto each fixation bolt 36. By so doing, the bottom plate metal fitting 22 is fixed to the vehicle body 16 with the plurality of fixation bolts 36, and the upper mount 12 is attached to the vehicle body 16 in the bottom plate metal fitting 22.

In the mount attachment section of the vehicle body 16, a generally circular mounting hole 38 is formed through it in the up-down direction. The central holes 26, 28 of the top and bottom plate metal fittings 20, 22 and the inner hole 24 of the connection rubber elastic body 18 in the upper mount 12 open to the lower side of the vehicle body 16 via the mounting hole 38.

Meanwhile, the lower mount 14 has a structure wherein an inner shaft member 40 and an outer tube member 42 that are disposed nearly coaxially and separately in the radial direction are elastically connected by a main rubber elastic body 44.

The inner shaft member 40 is in a cylindrical shape with a small diameter extending straightly in the up-down direction, and at its center, the inner shaft member 40 includes an inner hole 46 extending in the up-down direction. Especially in this embodiment, the inner hole 46 has substantially the same inner diameter dimension as the central hole 26 of the top plate metal fitting 20 of the upper mount 12, and a smaller outer diameter dimension than any inner diameters of the inner hole 24 of the connection rubber elastic body 18 and the central hole 28 of the bottom plate metal fitting 22 of the upper mount 12. Moreover, to the inner shaft member 40, upper and lower inside mating members 48, 50 are attached. These inside mating members 48, 50 have a ring shape or an annular plate shape, and they are externally fixed to and about two locations mutually separated in the axial direction in the inner shaft member 40.

In the outer periphery of the inner shaft member 40, upper and lower outside mating members 52, 54 are disposed coaxially and externally about the inner shaft member 40. The upper and lower outside mating members 52, 54 have a shape nearly equal to each other, and a generally cylindrical shape with a thin wall and a large diameter and a smaller axial dimension than the outer tube member 42 which will be described later. The upper and lower outside mating members 52, 54 are disposed at axial positions such that they face the upper and lower inside mating members 48, 50 in the radial direction.

Between the radially opposed faces of the inner shaft member 40 including the upper and lower inside mating members 48, 50 and the upper and lower outside mating members 52, 54, an upper rubber elastic body 56 and a lower rubber elastic body 58 are disposed to serve as outer wall rubbers constituting the main rubber elastic body 44. The upper and lower rubber elastic bodies 56, 58 each has a nearly annular plate shape, and, to the inner peripheral faces, the inner shaft member 40 and the upper and lower inside mating members 48, 50 are bonded by vulcanization, while to the outer peripheral faces, the upper and lower outside mating members 52, 54 are bonded by vulcanization. Besides, the inner peripheral ends of the upper and lower rubber elastic bodies 56, 58 are connected by a connection rubber 60 and formed integrally with each other. This connection rubber 60 has a tubular shape with a smaller outer diameter than the upper and lower rubber elastic bodies 56, 58. The connection rubber 60 is bonded by vulcanization to the outer peripheral face of the inner shaft member 40 between the inside mating members 48, 50 in the up-down direction.

Also, to the upper and lower outside mating members 52, 54, the outer tube member 42 is mounted such that the outer tube member 42 is externally fitted about them. The outer tube member 42 has a thin generally cylindrical shape with a larger diameter and a smaller axial dimension than the inner shaft member 40, and to the inner peripheral face thereof, a seal rubber layer 62 is formed to cover it. The outer tube member 42 disposed externally about the upper and lower outside mating members 52, 54 is subjected to a diameter reduction process such as 360-degree radial compression, so that the outer tube member 42 is mounted externally to and about the upper and lower outside mating members 52, 54. The seal rubber layer 62 seals the gap between the fitting faces of the outer tube member 42 and the outside mating members 52, 54 fluid-tightly.

By mounting the outer tube member 42 in this way, a filling region 64 that is closed to the external space and filled with a non-compressible fluid or liquid is defined between the radially opposed faces of the inner shaft member 40 and the outer tube member 42 and between the upper and lower rubber elastic bodies 56, 58 in the axial direction. As the non-compressible fluid to be filled, a low-viscosity fluid such as water, ethylene glycol, alkylene glycol, polyalkylene glycol, silicone oil, and a mixture liquid of some of them is preferably adopted.

In the filling region 64, a partition wall 66 is disposed. The partition wall 66 has an annular plate shape as a whole, expanding roughly in the axis-perpendicular direction in the space between the upper and lower rubber elastic bodies 56, 58 in the axial direction. The partition wall 66 is disposed across the radial space between the inner shaft member 40 and the outer tube member 42. This partition wall 66 partitions the filling region 64 at the substantial center in the up-down direction. On the upper side of the partition wall 66, there is formed an upper fluid chamber 68 whose wall is partially constituted by the upper rubber elastic body 56, while, on the lower side of the partition wall 66, there is formed a lower fluid chamber 70 whose wall is partially constituted by the lower rubber elastic body 58.

Figure 2:
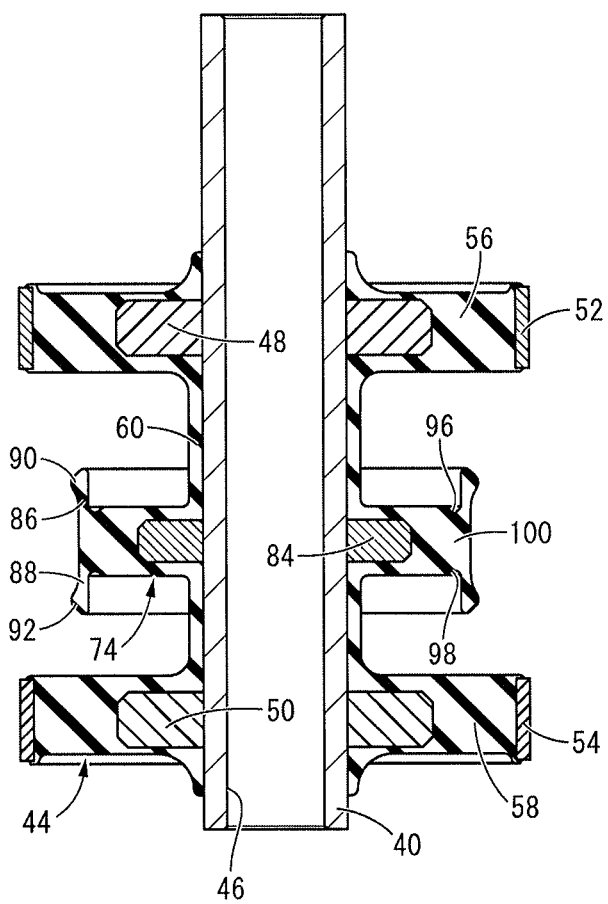
FIG. 2 is a cross sectional view of an integrally vulcanization molded component of a main rubber elastic body constituting the cab mount shown in FIG. 1.

As FIGS. 1 and 2 show, the outer peripheral part of the partition wall 66 is constituted by an orifice member 72, while the inner peripheral part thereof is constituted by a partition wall rubber 74.

The orifice member 72 is a rigid member made of metal, synthetic resin, or the like. In this embodiment, the orifice member 72 is constituted by a pair of divided half bodies combined in the diametrical direction, and takes a substantially cylindrical shape as a whole. Moreover, at the outer peripheral part of the orifice member 72, a peripheral groove 76 is provided extending in the peripheral direction while opening to the outer peripheral face. The peripheral groove 76 of this embodiment extends in a helical shape with a length of one periphery or longer. For the orifice member 72, the axially middle part is thicker in the radial direction than the both axial ends, and the peripheral groove 76 is formed in the thickened axially middle part.

The orifice member 72 is fitted in and fixed to the inner peripheral face of the outer tube member 42, in the outer peripheral face thereof. The orifice member 72 is provided on the side of the outer tube member 42 and disposed to extend across the entire periphery along the inner peripheral face of the outer tube member 42. For the orifice member 72, the axial dimension of the outer peripheral part is larger than the inner peripheral part, and the outer peripheral part is clamped and thus positioned in the axial direction between the upper and lower outside mating members 52, 54.

The peripheral groove 76 of the orifice member 72 is covered by the outer tube member 42 that is fitted externally to the orifice member 72. This forms an orifice passage 78 extending in the peripheral direction along the inner peripheral face of the outer tube member 42. One end in the length direction of this orifice passage 78 opens to the upper fluid chamber 68 via a communication hole 80, while the other end in the length direction of the orifice passage 78 opens to the lower fluid chamber 70 via a communication hole 82. Consequently, the upper and lower fluid chambers 68, 70 are mutually connected owing to the orifice passage 78.

Meanwhile, the partition wall rubber 74 is a rubber elastic body having a nearly annular plate shape, and it is formed integrally with the connection rubber 60 constituting the main rubber elastic body 44. With the partition wall rubber 74, the inner peripheral part is fixed to the side of the inner shaft member 40 and protrudes to the outer periphery from the side of the inner shaft member 40. The partition wall rubber 74 of the present embodiment is integrally formed with the upper and lower rubber elastic bodies 56, 58, as is clear from the fact that it is integrally formed with the connection rubber 60, and it constitutes a portion of the main rubber elastic body 44.

In the axially middle portion of the inner shaft member 40 where the partition wall rubber 74 is fixed, a rigid outside projection 84 is provided to project to the outer peripheral side. The outside projection 84 of this embodiment is formed with a metal or the like, and has an annular plate shape extending continuously across the entire periphery in the peripheral direction. The outside projection 84 is externally fixed on and about the inner shaft member 40. The inner peripheral part of the partition wall rubber 74 is fixed to the outside projection 84, and the substantial radial free length of the partition wall rubber 74 is set by the radial distance between the orifice member 72 and the outside projection 84. The radial free length of the partition wall rubber 74 is made shorter enough than the upper and lower rubber elastic bodies 56, 58, and the elastic deformation amount by the relative pressure difference between the two fluid chambers 68, 70 is made small.

At the outer peripheral part, which is the tip part of the partition wall rubber 74, upper and lower seal tubular parts 86, 88 are integrally formed to protrude to the opposite axial sides. In this embodiment, the upper and lower seal tubular parts 86, 88 have the same shape as each other.

As FIG. 2 shows, the seal tubular parts 86, 88 have a cylindrical shape protruding straightly in the axial direction with a substantially constant transverse face and roughly the same outer diameter dimension as the outer diameter of the partition wall rubber 74, as a single state before being disposed and inserted in the orifice member 72 provided on the side of the outer tube member 42. The seal tubular parts 86, 88 have a structure of a thin tubular wall allowing elastic deformation. The thickness dimension for the seal tubular parts 86, 88 is set as appropriate considering the employed rubber material and size, as well as the fluid pressure occurring in a vibration input, the required durability, and the like, and they are not limited. Generally, a thickness dimension of 3 mm or smaller is preferable, and a thickness dimension of around 0.3-2 mm is more preferable.

Furthermore, the protruding tip parts of the seal tubular parts 86, 88 are made large across the entire periphery in thickness direction. Especially in the present embodiment, the protruding tip part is made larger in thickness direction to the outer peripheral side, thereby integrally forming annular fitting parts 90, 92 protruding to the outer periphery from the seal tubular parts 86, 88. By providing these annular fitting parts 90, 92, the outer diameter for the protruding tip parts of the seal tubular parts 86, 88 is larger than that for the basal end parts thereof. In the partition wall rubber 74 including the seal tubular parts 86, 88, the annular fitting parts 90, 92 have the largest outer diameter dimension. Besides, the outer diameter dimension for the annular fitting parts 90, 92 is set larger than the inner diameter dimension of the axially middle part of the orifice member 72.

The partition wall rubber 74 is fitted in the axially middle part of the orifice member 72 provided on the side of the outer tube member 42 in an embodiment permitting relative axial displacement. As FIG. 1 shows, in the assembly state wherein the partition wall rubber 74 is fitted in the orifice member 72, the outer peripheral faces of the annular fitting parts 90, 92 are abutted on the inner peripheral face of the orifice member 72 in a sealing state of being pressed against it across the entire periphery. The annular fitting parts 90, 92 fitted in the orifice member 72 in this way is slidable in the axial direction relative to the orifice member 72 on the side of the outer tube member 42, in an axial vibration input.

Also, in the assembly state where the partition wall rubber 74 is fitted in the orifice member 72, the annular fitting parts 90, 92 are pressed against the orifice member 72. As a result, the outer peripheral faces of the seal tubular parts 86, 88 are disposed so that they are apart from the inner peripheral face of the orifice member 72 to the inner periphery, thus forming a space 94 between the outer peripheral faces of the seal tubular parts 86, 88 and the inner peripheral face of the orifice member 72. The outer diameter dimension of the partition wall rubber 74 is smaller than the inner diameter dimension of the orifice member 72. The spaces provided between the upper and lower seal tubular parts 86, 88 and the orifice member 72 are communicated with each other by a space provided between the outer peripheral face of the partition wall rubber 74 and the inner peripheral face of the orifice member 72, so as to form the integral space 94.

Moreover, in the assembly state where the partition wall rubber 74 is fitted in the orifice member 72, the annular fitting parts 90, 92 are pressed against the orifice member 72, so that the seal tubular parts 86, 88 are in a state of being elastically deformed such that they gradually bend to the inner peripheral side as they go toward the protruding tips. By so doing, the annular fitting parts 90, 92 are pressed against the orifice member 72 also by the elasticity of the seal tubular parts 86, 88.

Furthermore, at the outer peripheral part of the partition wall rubber 74, in the both faces in the up-down direction of the thickness direction of the partition wall rubber 74, groove-shaped recesses 96, 98 are formed extending in the peripheral direction on the inner peripheral side of the seal tubular parts 86, 88. By forming the upper and lower recesses 96, 98, the thickness dimension of the partition wall rubber 74 is partially thinner on the inner peripheral side of the seal tubular parts 86, 88.

Specifically, in the radially middle part of the partition wall rubber 74, there is formed a constricted section 100 that is thinned by the upper and lower recesses 96, 98, and the bending deformation rigidity in the axial direction of the partition wall rubber 74 is made small in the constricted section 100. The outer peripheral end of the partition wall rubber 74 including the upper and lower seal tubular parts 86, 88, which is positioned on the outer peripheral side of the constricted section 100, can undergo elastic deformation in the axial direction with swinging motion. In this embodiment, each of the recesses 96, 98 has a groove shape extending in a ring shape continuously in the peripheral direction.

The lower mount 14 including the upper and lower fluid chambers 68, 70 partitioned by the partition wall 66 of this structure is mounted and superposed to the lower face of the mount attachment section in the vehicle body 16.

The inner shaft member 40 of the lower mount 14 extends out to the axially upper side from the outer tube member 42, and protrudes upward via the mounting hole 38 formed in the mount attachment section of the vehicle body 16. In relation to the upper mount 12 mounted from above to the mount attachment section of the vehicle body 16, the inner shaft member 40 is inserted from below, while superposing the upper end of the inner shaft member 40 to the inner peripheral end of the top plate metal fitting 20 of the upper mount 12.

The top plate metal fitting 20 of the upper mount 12 and the inner shaft member 40 of the lower mount 14 are mounted to a not-shown cab housing of the vehicle, by a not-shown fixation bolt inserted through the central hole 26 of the top plate metal fitting 20 and the inner hole 46 of the inner shaft member 40. In this mounted state, the top plate metal fitting 20 of the upper mount 12 and the inner shaft member 40 of the lower mount 14 are made integral by fastening fixation owing to fastening force of the fixation bolt.

In the outer periphery of the inner shaft member 40, a prescribed space is set between the inner shaft member 40 and any of the inner peripheral face of the inner hole 24 of the connection rubber elastic body 18 and the inner peripheral face of the central hole 28 of the bottom plate metal fitting 22 in the upper mount 12, and the inner peripheral face of the mounting hole 38 of the vehicle body 16. By this space, in a vibration load input, interference and contact of the inner shaft member 40 with respect to the connection rubber elastic body 18, the bottom plate metal fitting 22, the vehicle body 16, and the like are reduced or eliminated.

On the other hand, the outer tube member 42 of the lower mount 14 is fixed and mounted to the vehicle body 16 via an outer bracket 102.

The outer bracket 102 includes a mating tube part 104 having a large-diameter cylindrical shape, and the outer tube member 42 of the lower mount 14 is secured press-fit into the mating tube part 104. Also, at the axially upper end of the mating tube part 104 in the outer bracket 102, a flange part 106 expanding to the outer periphery is integrally formed, and a plurality of bolt mounting holes 108 are provided in the flange part 106.

In each bolt mounting hole 108, the fixation bolt 36 is secured press-fit so as to protrude upward, and the fixation bolt 36 is inserted through the bolt insertion hole 34 of the vehicle body 16 and the bolt insertion hole 32 of the bottom plate metal fitting 22 in the upper mount 12 and threaded onto a not-shown nut. Consequently, the flange part 106 of the outer bracket 102 mounted to the lower mount 14, the vehicle body 16, and the bottom plate metal fitting 22 of the upper mount 12 are fixation by fastening to one another. In the peripheral wall part of the mating tube part 104, a window 110 is formed at a position corresponding to each bolt mounting hole 108 in the peripheral direction, thereby avoiding interference between the head part of the fixation bolt 36 and the mating tube part 104.

However, in the cab mount 10 of this embodiment having the above-referenced structure, in relation to an axial support load, a prescribed support spring characteristics is exerted mainly by compression deformation in the connection rubber elastic body 18 of the upper mount 12. With respect to the support load in the axis-perpendicular direction, a prescribed support spring characteristics is exerted by the connection rubber elastic body 18 of the upper mount 12 that undergoes shear deformation, and the upper and lower rubber elastic bodies 56, 58 and the partition wall rubber 74 of the lower mount 14 that undergo compression deformation.

Additionally, in input of an axial vibration load between the inner shaft member 40 and the outer tube member 42, the fluid flows through the orifice passage 78 connecting the upper and lower fluid chambers 68, 70 in the lower mount 14, so that a prescribed vibration-damping effect is exerted based on the flowing action of the fluid.

Then, with both of the upper and lower rubber elastic bodies 56, 58 that constitute the outside wall parts of the upper and lower fluid chambers 68, 70, the inner periphery and the outer periphery are fixed respectively to the inner shaft member 40 and the outer tube member 42, and the rubber elastic bodies 56, 58 undergo shear deformation in roughly the same direction. On the other hand, with the partition wall 66, the orifice member 72 on the outer peripheral side is fixed to the outer tube member 42, while the partition wall rubber 74 on the inner peripheral side is fixed to the inner shaft member 40, and the partition wall rubber 74 is not fixed to the orifice member 72 and allowed to be axially displaced relative to it. Consequently, accompanying axial displacement of the inner shaft member 40 relative to the outer tube member 42, the partition wall rubber 74 is moved in the axial direction relative to the side of the outer tube member 42.

As a result, the partition wall rubber 74 undergoes reciprocating displacement in the approach/separation direction relative to the upper and lower rubber elastic bodies 56, 58 as synchronizing the vibration input in the axial direction, thereby efficiently inducing relative pressure fluctuation with respect to the upper and lower fluid chambers 68, 70. Based on this pressure fluctuation, the fluid flows through the orifice passage 78 between the upper and lower fluid chambers 68, 70, thus exhibiting the vibration-damping effect owing to the flow action like fluid resonance action.

Particularly, neither of the upper and lower fluid chambers 68, 70 in this embodiment has a flexible wall part that is easily deformable. The upper and lower fluid chambers 68, 70 are pressure-receiving chambers wherein reverse pressure fluctuations occur depending on positive/negative relation, accompanying the displacement of the partition wall rubber 74 in the approach/separation direction relative to the upper and lower rubber elastic bodies 56, 58. This makes it possible to largely and assertively keep the water head pressure and the flow amount of the fluid made to flow through the orifice passage 78 when a vibration is input.

The seal tubular parts 86, 88 that protrude on both axial sides from the outer peripheral face of the partition wall rubber 74 are pressed against the orifice member 72 at the thick annular fitting parts 90, 92 provided at respective tips thereof, thus ensuring the sealing property between the partition wall rubber 74 and the orifice member 72. This avoids short-circuit communication between the upper and lower fluid chambers 68, 70 in a vibration input, thereby stably keeping the flowing amount of the fluid flowing via the orifice passage 78.

Especially, the annular fitting parts 90, 92, which are seal parts, are provided at positions out of the partition wall rubber 74 on both axial sides. Thus, for keeping the seal performance, it is not necessary to strongly press the main part of the partition wall rubber 74 against the inner peripheral face of the orifice member 72. Therefore, in relation to an input load in the axis-perpendicular direction, a large spring rigidity of the partition wall rubber 74 with a small radial dimension can be effectively prevented from adversely affecting. Moreover, the thick annular fitting parts 90, 92 are provided at the protruding tips of the seal tubular parts 86, 88. Consequently, in assembly of the partition wall rubber 74 to the orifice member 72, as well as in axial displacement of the partition wall rubber 74 relative to the orifice member 72, biting of the seal tubular parts 86, 88 is avoided, exerting stable sealing performance. Also, sliding contact resistance between the partition wall rubber 74 and the orifice member 72 is moderated, so that improvement of the axial spring characteristics and noise avoidance are achieved, and durability decrease due to abrasion in the sliding contact part can be resolved as well.

Moreover, the seal tubular parts 86, 88 connecting the annular fitting parts 90, 92 and the partition wall rubber 74 are provided to cover the inner peripheral face of the orifice member 72. Since these seal tubular parts 86, 88 are thin and they are easily deformed, when the positive pressure induced in one of the fluid chambers 68 (70) in input of an axial vibration is exerted to the inner peripheral face of the seal tubular part 86 (88), the seal tubular parts 86, 88 are elastically deformed to the outer peripheral side and pressed against the inner peripheral face of the orifice member 72. As a result, taking advantage of the pressure of the fluid chamber 68 (70), it is possible to more effectively avoid short-circuit of the upper and lower fluid chambers 68, 70 via the space between the seal tubular parts 86, 88 and the orifice member 72.

Particularly, the partition wall rubber 74 and the seal tubular parts 86, 88 are all likely to tilt backward in the movement direction because of the action of friction resistance and fluid pressure in relation to the inner peripheral face of the orifice member 72, when moving in the axial direction relative to the orifice member 72. As a result, the seal tubular part 86 (88) that extends to the front side in the movement direction is easily pressed against the inner peripheral face of the orifice member 72, so that it is possible to more efficiently ensure the target sealing property.

Especially in this embodiment, by the constricted section 100 provided at the radially middle part of the partition wall rubber 74, the outer peripheral part of the partition wall rubber 74 wherein the upper and lower seal tubular parts 86, 88 are formed undergoes axial elastic deformation. Consequently, the annular fitting parts 90, 92 provided at the tip parts of the seal tubular parts 86, 88 are easily pressed against the inner peripheral face of the orifice member 72.

Figure 3:
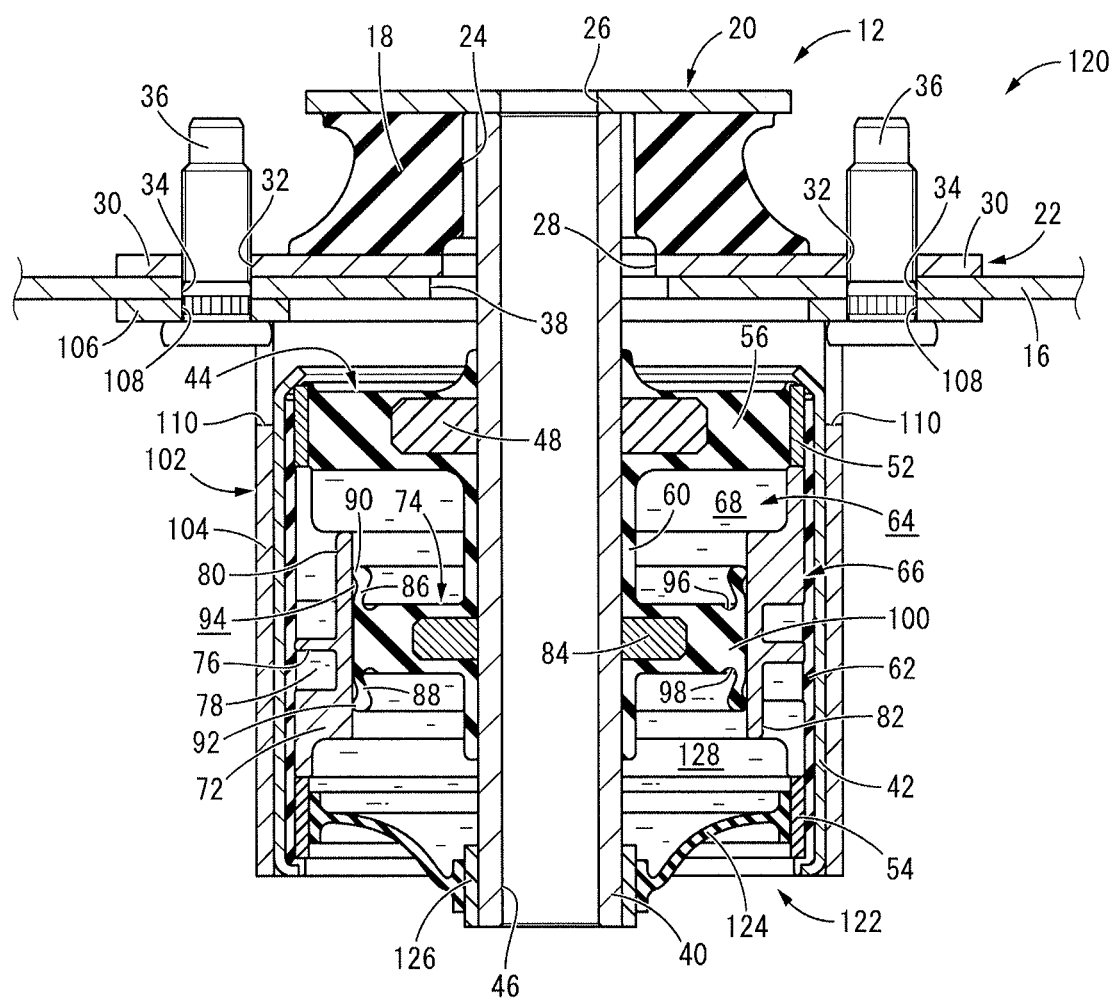
FIG. 3 is a cross sectional view showing a cab mount as a second embodiment of the present invention.

Next, FIG. 3 shows an automotive cab mount 120 as a second embodiment of the present invention. The cab mount 120 has a lower mount 122 serving as a fluid-filled tubular vibration-damping device with a structure following the present invention. In the description hereinafter, members and parts nearly equal to those of the aforesaid embodiment will be given the same code number as those of the above-mentioned embodiment in the drawings, and a detailed description of those will be omitted.

Specifically, in the lower mount 14 of the first embodiment, the upper and lower rubber elastic bodies (56, 58) having roughly the same structure are provided. When an axial vibration is input, both the upper fluid chamber (68) whose wall is partially constituted by the upper rubber elastic body (56) and the lower fluid chamber (70) whose wall is partially constituted by the lower rubber elastic body (58) are the pressure-receiving chambers wherein reverse pressure fluctuations occur depending on positive/negative relation. On the other hand, in the lower mount 122 of this embodiment, the structures of the upper and lower rubber elastic bodies are different to each other.

More specifically, in the present embodiment, the lower rubber elastic body is a flexible film 124, which is thinner than the upper rubber elastic body 56. Because of its thinness, the flexible film 124 can undergo flexural deformation comparatively easily inwards and outwards in the axial direction. Additionally, in the longitudinal cross section of FIG. 3, the flexible film 124 has a cross sectional shape that is curved in an arcuate shape to the inner side (the upper side), and the degree of freedom in deformation and the level of allowable deformation to the inside and the outside improve.

To the outer peripheral face of the flexible film 124, the outside mating member 54 is bonded by vulcanization, while to the inner peripheral face of the flexible film 124, a ring-shaped inside mating member 126 is bonded by vulcanization. The inside mating member 126 is externally disposed about and fixed on the inner shaft member 40, while the outside mating member 54 is inserted in and fixed to the outer tube member 42. Owing to this, the flexible film 124 is attached to the lower opening of the outer tube member 42. The upper rubber elastic body 56 in the present embodiment has the same structure as that of the first embodiment, i.e., the main rubber elastic body 44 is constituted including the upper rubber elastic body 56 and the partition wall rubber 74.

In this embodiment, the filling region 64 is defined axially between the upper rubber elastic body 56 and the flexible film 124, which is the lower rubber elastic body, and the filling region 64 is partitioned by the same partition wall 66 as that of the first embodiment. By so doing, on the upper side of the partition wall 66, there is formed the upper fluid chamber 68 whose wall is partially constituted by the upper rubber elastic body 56, while on the lower side of the partition wall 66, there is formed a lower fluid chamber 128 whose wall is partially constituted by the flexible film 124. The upper fluid chamber 68 and the lower fluid chamber 128 are communicated with one another via the orifice passage 78.

For the cab mount 120 of this embodiment with this structure, in an axial input vibration, namely, axial movement of the partition wall 66 accompanying the relative axial movement of the inner shaft member 40 and the outer tube member 42, in the upper fluid chamber 68 that is a pressure-receiving chamber, an assertive pressure fluctuation is induced. On the other hand, in the lower fluid chamber 128, bloating/contraction deformation to the inside and the outside of the flexible film 124, which constitutes a portion of the wall, easily permits volume change, thus moderating or eliminating the pressure fluctuation. The lower fluid chamber 128 constitutes an equilibrium chamber for which in a vibration input, the fluid pressure fluctuation of the inside is suppressed compared with the upper fluid chamber 68, or the fluid pressure is kept roughly constant.

Therefore, when an axial vibration is input, based on the relative pressure fluctuation induced between the upper fluid chamber 68 and the lower fluid chamber 128, a fluid flow occurs through the orifice passage 78 between the upper and lower fluid chambers 68, 128.

Also in the cab mount 120 including the lower mount 122 of the present embodiment having the aforementioned structure, the same effect as that of the first embodiment can be exhibited.

The embodiments of the present invention have been described above, but this invention is not limited by the specific description of the embodiments.

For example, the radial dimension of the partition wall rubber 74 can be set depending on the vibration-damping characteristics, the spring rigidity, or the like required for the vibration-damping device. For example, it is also possible to set as appropriate the effective free length in the radial direction of the partition wall rubber 74, by adjusting the projecting height of the outside projection 84 that projects peripherally outward from the inner shaft member 40.

The seal tubular parts 86, 88 are not necessarily limited to a tubular shape extending linearly. For example, it is also possible that the seal tubular parts 86, 88 have a tapered tube shape slanting such that its diameter becomes gradually larger as it goes to the side of the protruding tip with the annular fitting parts 90, 92, and the annular fitting parts 90, 92 are pressed against the side of the outer tube member 42 to improve the sealing performance.

It is possible to partially expand the diameter of the axially middle part of the inner shaft member 40 and provide the outside projection 84 integrally with the inner shaft member 40, for example. Besides, the outside projection 84 is not an indispensable feature in this invention, thus it can be omitted. Also, for example, by fixing a rigid intermediate ring at the radially middle part of the partition wall rubber 74, it is possible as well to set the radial spring of the partition wall rubber 74 hard.

With respect to the orifice passage 78 for communication between the fluid chambers 68, 70, the structure, the length, the cross sectional area, and the like may be changed depending on the required vibration-damping characteristics. For example by perforating the radially middle part of the orifice member 72 in the axial direction, the orifice passage 78 can be formed as well.

Moreover, the member on the side of the outer tube member 42 into which the annular fitting parts 90, 92 are slidably fitted is not necessarily limited to the orifice member 72. For example, the annular fitting parts 90, 92 may be also fitted in the outer tube member 42, slidably along the outer tube member 42, without interposing the orifice member 72.

In the aforesaid embodiment, there is shown as an example the structure wherein the upper and lower rubber elastic bodies 56, 58 and the partition wall rubber 74 are integrally formed to constitute the main rubber elastic body 44. However, the upper and lower rubber elastic bodies 56, 58 and the partition wall rubber 74 may be separately structured.

In the above-mentioned embodiments, there are shown as examples the cab mounts 10, 120 of the structure wherein the upper mount 12 and the lower mount 14 (122) are combined. However, for example it is possible as well that the upper rubber elastic body has the same structure as that of the connection rubber elastic body 18 of the upper mount 12 in the above-referenced embodiments in order to constitute the cab mount with a single mount. In this case, the entirety of the cab mount constitutes the fluid-filled tubular vibration-damping device according to the present invention. In this case, the lower rubber elastic body may be thick-walled like the first embodiment, and it may be a thin flexible film like the second embodiment.

In the aforesaid embodiments, there are shown examples that the fluid-filled tubular vibration-damping device according to the present invention is applied to the cab mounts 10, 120. However, the fluid-filled tubular vibration-damping device according to this invention can be applied also to an engine mount, a sub frame mount, or the like. For example, in the case that the structure according to the present invention is applied to the engine mount, the sub frame mount, or the like, it is possible to constitute it only by the lower mount 14 (122) of the above-mentioned embodiments, and the structures such as the upper mount 12 and the connection rubber elastic body 18 are dispensable.

What is claimed is:

1. A fluid-filled tubular vibration-damping device comprising:
    an inner shaft member;
    an outer tube member;
    a main rubber elastic body connecting the inner shaft member and the outer tube member;
    a filling region of a non-compressible fluid formed between the inner shaft member and the outer tube member and partitioned by a partition wall rubber into two fluid chambers located at axially opposite sides thereof, the partition wall rubber being fixed to a side of the inner shaft member in an inner peripheral part of the partition wall rubber while being inserted in an inner bore of an annular orifice member fixed to the outer tube member at an outer peripheral part of the partition wall rubber so that the partition wall rubber is movable in an axial direction relative to the inner bore of the orifice member;
    an orifice passage defined by the orifice member and connecting the two fluid chambers;
    a pair of seal tubular parts being integrally formed at the outer peripheral part of the partition wall rubber such that one of the seal tubular parts protrudes axially upward from an axially upper face of the partition wall rubber with a cylindrical shape and another of the seal tubular parts protrudes axially downward from an axially lower face of the partition wall rubber with a cylindrical shape; and
    a pair of annular fitting parts being integrally formed at respective axially protruding tip parts of the pair of seal tubular parts, the annular fitting parts protruding diametrically outwards from the seal tubular parts so that the annular fitting parts have a thicker wall than the seal tubular parts, and the annular fitting parts being fitted within the inner bore of the orifice member such that the annular fitting parts are slidable in relation to the inner bore of the orifice member,
    wherein an outer diameter dimension of the annular fitting parts is set larger than an outer diameter dimension of the seal tubular parts and an outer diameter dimension of the partition wall rubber, and
    wherein the outer diameter dimension of the annular fitting parts is larger than an inner diameter dimension of the inner bore of the orifice member so that the annular fitting parts are pressed against the inner bore of the orifice member, while the outer diameter dimension of the seal tubular parts and the outer diameter dimension of the partition wall rubber are smaller than the inner diameter dimension of the inner bore of the orifice member so that an integral space is formed between outer circumferential surfaces of the seal tubular parts and the partition wall rubber and the inner bore of the orifice member, the integral space being positioned axially between the pair of annular fitting parts.

2. The fluid-filled tubular vibration-damping device according to claim 1, wherein the main rubber elastic body has an outer wall rubber constituting each axial side wall of the filling region, while the partition wall rubber is integrally formed with the outer wall rubber on each axial side.

3. The fluid-filled tubular vibration-damping device according to claim 1, wherein in the partition wall rubber, a groove-shaped recess is provided extending in a peripheral direction in each axial side face at a position on an inner peripheral side of a protrusion portion of the seal tubular parts protruding to each axial side.

4. The fluid-filled tubular vibration-damping device according to claim 1, wherein at an axially middle portion of the inner shaft member, an outside projection is formed projecting to the outer peripheral side, and the inner peripheral part of the partition wall rubber is fixed to the outside projection.

* * * * *